(12) United States Patent
Barton

(10) Patent No.: US 9,255,776 B1
(45) Date of Patent: Feb. 9, 2016

(54) MUZZLE VELOCITY SENSOR FOR SMART AMMUNITION

(71) Applicant: Aaron Barton, Oswego, NY (US)

(72) Inventor: Aaron Barton, Oswego, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 14/486,005

(22) Filed: Sep. 15, 2014

(51) Int. Cl.
 *F42B 30/00* (2006.01)
 *F41A 31/00* (2006.01)

(52) U.S. Cl.
 CPC .................................. *F42B 30/006* (2013.01)

(58) Field of Classification Search
 CPC ........ F42B 10/00; F42B 30/00; F42B 30/006; F42B 30/02; F42B 30/08; F42B 30/10; F42B 35/00; G01L 15/14; F41A 31/00; F42C 17/00; F42C 17/04; F42C 19/06
 USPC .................................. 102/439; 73/167; 89/6.5
 See application file for complete search history.

(56) References Cited

U.S. PATENT DOCUMENTS

| | | | | |
|---|---|---|---|---|
| 4,649,796 | A * | 3/1987 | Schmidt | 89/6.5 |
| 4,862,785 | A * | 9/1989 | Ettel et al. | 89/6.5 |
| 5,827,958 | A * | 10/1998 | Sigler | 73/167 |
| 7,595,633 | B2 * | 9/2009 | Martin et al. | 324/179 |
| 2011/0041674 | A1 * | 2/2011 | Schneider et al. | 89/6.5 |
| 2012/0085162 | A1 * | 4/2012 | Furch et al. | 73/167 |

* cited by examiner

*Primary Examiner* — Bret Hayes
(74) *Attorney, Agent, or Firm* — Michael C. Sachs

(57) ABSTRACT

In a gun tube for firing rounds of smart ammunition, a sensor means applied to the ammunition which enables the calculation of muzzle velocity in the instant as the ammunition leaves the muzzle edge of the gun tube. The sensor relies on measurement of magnetic field induced voltages which are unique as the ammunition leaves the muzzle edge of the gun tube. Each round of ammunition has a planar transformer of wiring applied longitudinally on the side of the round, which aids in creating the necessary magnetic fields.

4 Claims, 7 Drawing Sheets

MUZZLE VELOCITY SENSOR FOR SMART AMMUNITION

U.S. GOVERNMENT INTEREST

The inventions described herein may be made, used, or licensed by or for the U.S. Government for U.S. Government purposes.

BACKGROUND OF INVENTION

This invention relates to linear velocity measuring sensors. In particular, but not exclusively, this invention is a device that allows gun-fired, smart ammunition to precisely measure its own muzzle exit velocity for use in precision guidance. This invention allows for the precise measurement of velocity in the axial direction of motion, while cancelling the effects of motion in the radial direction.

Sensors are generally used in smart ammunition in order to improve precision, especially at long firing ranges. The ultimate goal is to reduce target impact dispersion of a particular round. While in flight, a smart round will use its sensors to determine if corrections are necessary to its trajectory. For instance, GPS modules, magnetometers, and gyroscopes, can be used to determine location, heading, and orientation respectively. The round's fuze will use that information to determine if maneuver needs to be performed, if the round should recalculate a timer, if the round should dud, and the like.

It is sometimes necessary for a smart round to know its muzzle exit velocity. In smart rounds that use a timed detonation—such as those that have an air burst mode—the time set for detonation is computed from: the range to target, the expected trajectory of the round, and an expected muzzle exit velocity. In order for the round to precisely detonate at a specific point in its trajectory, especially for air burst mode, all of these factors need to be precisely known.

Muzzle exit velocity is typically a value that is not measured, rather it is estimated before the round is shot based on the type of round being fired, its weight, and the type and amount of propellant being used. This is contrary to the range to target and round trajectory, both of which are already accurately determined by laser range finder and ballistic computer, respectively.

While certain methods have been proposed to measure muzzle velocity, each has certain shortcomings. For example, in "Apparatus for Measure the Muzzle Velocity of a Projectile" (U.S. Pat. No. 3,659,201, issued April 1972), Remo Vogelsang describes an invention where two coils sit co-axially at the end of a gun tube, each energized with a DC current source, and connected electrical in series. When a bullet is fired, it generates two voltage pulses as it passes through both coils. The time difference between each pulse is measured, and combined with a temperature compensation technique for the spacing between each coil, velocity is determined.

In "Inductance Type Velocity Measuring Apparatus" (U.S. Pat. No. 3,824,463, issued July 1974), Kenneth L. Oehler describes a similar invention, where again, two coils sit co-axially at the end of a gun tube. In his invention, the both coils are electrically connected as frequency determining elements of an oscillator. When a bullet is fired through the coils, the frequency of the oscillator is modulated twice. An FM discriminator circuit then detects the modulation, subsequent pulse shaping circuits produce "start" and "stop" pulses, whose time interval between along with the spacing of the coils is used to calculate exit velocity.

Finally, in "Device and Method for Determining the Muzzle Velocity of Projectile" (US 2004/0250615 A1, Pub Date December 2004), Aldo Alberti and Klaus Munzel describe an invention where a single coil is placed co-axially at the end of a gun tube, energized with a DC current, creating small localized magnetic field. As a bullet is fired, it changes the magnetic field within the coil, which induces a voltage pulse across the terminals of the coil. This pulse is detected, its pulse width measured, and used to determine exit velocity.

Nonetheless, there remains a need for a more accurate muzzle velocity measuring device as provided by this invention.

BRIEF SUMMARY OF INVENTION

This invention allows a smart round to measure its own muzzle exit velocity by using the edge of the gun tube as a reference. The round's added sensor is a form of a special planar air-core sensing transformer placed on the side of the round together with associated drive and measurement electronics also added to the round. As the sensor moves past the edge of the tube, its displacement can be determined from the sensor's voltage output. From the point of view of the round, by measuring the amount of time it takes for the edge of the tube to undergo a set displacement (relative to the sensor), the velocity of the round itself can be determined. The geometry of the air-core sensing transformer additionally cancels motion in radial directions, allowing for very precise axial displacement measurements, and hence precision velocity measurements.

The sensor makes use of interference between a metal surface with an abrupt ending, and an oscillating magnetic field at a fixed frequency, to determine how fast that ending is moving (relative to the sensor), past the sensor. In the case of a smart round, the metal surface would be the inner surface of the gun tube firing the round, and the edge would be the end of the tube at the muzzle. The oscillating magnetic field is created by a planar air-coil transformer attached to the side of the round, whose primary winding is energized with an ac current. As further explained herein, the secondary of the transformer has a particular geometry that will allow the position of the gun tube edge to be determined, relative to the location of the round

OBJECTS OF THE INVENTION

Accordingly, it is an object of the present invention to provide a sensor means which enables the calculation of muzzle velocity in the instant as a smart ammunition leaves the muzzle edge of a gun tube from which it is fired.

Another object of the present invention is to provide measurement of magnetic field induced voltages which are unique as a round of smart ammunition leaves the muzzle edge of a gun tube from which it is fired.

It is a further object of the present invention to provide each round of smart ammunition with a planar transformer of wiring applied longitudinally on the side of such round, which aids in creating necessary magnetic fields to measure exit velocity as the smart ammunition leaves the muzzle edge of a gun tube from which it is fired.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here just for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

LIST OF DRAWINGS

The features of the present invention and the manner in which they are attained will become apparent, and the invention itself will be better understood by reference to the accompanying drawings, wherein.

DETAILED DESCRIPTION

Figure 1:
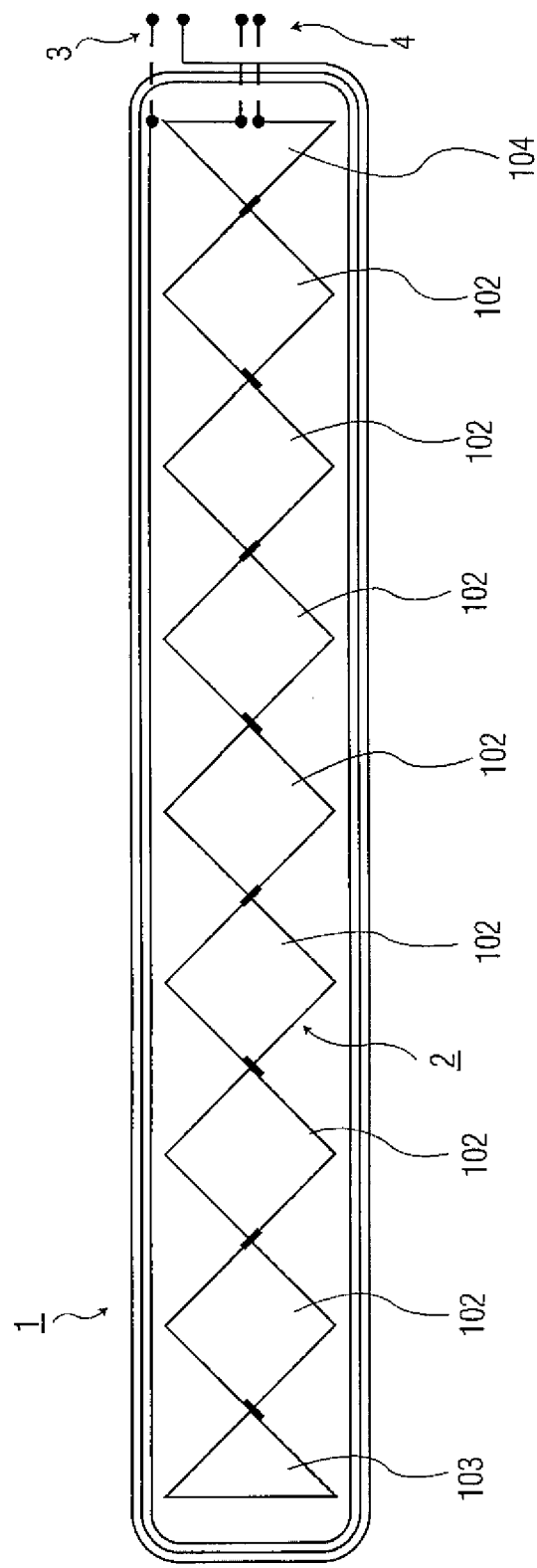
FIG. 1 is a view of a planar air-coil transformer according to this invention.

Referring to FIG. 1, a first embodiment of the invention includes a planar loop of several turns of wire, referred to now as the "primary" of this air-coil transformer. The primary coil 1 is a planar loop of several turns, whose terminals 3 are located at the right end of the figure. The "secondary" coil 2 is a single loop (a single wire) with multiple twists. This single loop wire has its terminals (4) shown at the right side of the figure. Within single loop 2, the twists form multiple minor loops 102, and end, minor loops 103, 104. The end loops 103, 104, have half the area of a minor loop 102. The primary is used to generate an oscillating magnetic field, while the secondary is used to measure that field, by making a voltage available at its terminals when connected to a high-impedance amplifier. This voltage is dependent on the strength of the field, the oscillating frequency, and the position of the edge of the gun tube (relative to the secondary, e.g.), as will now explained.

Figure 4:
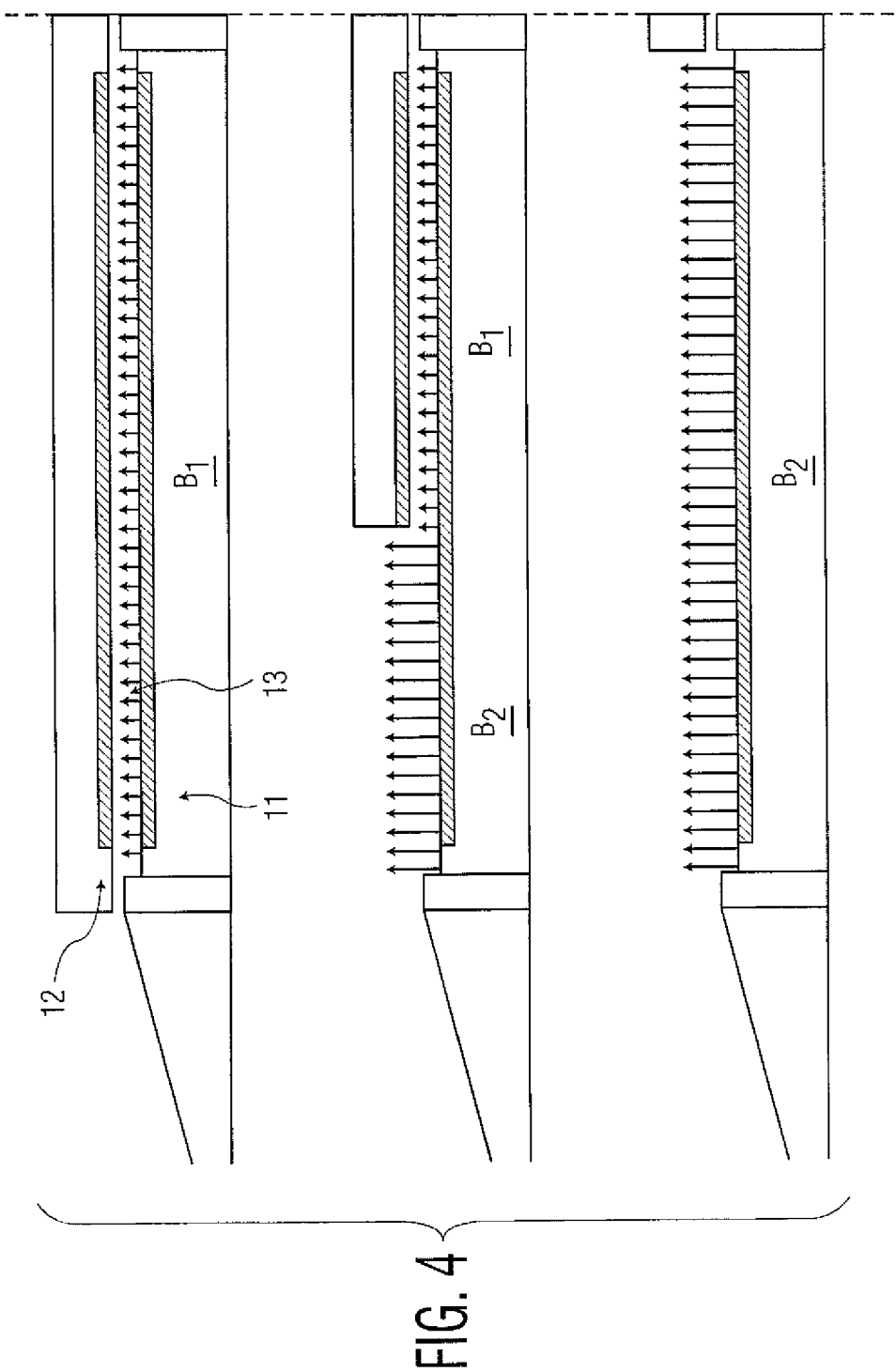
FIG. 4 is a cross section of the smart round and the gun tube, at the same moments in time as depicted in FIG. 3.

A sinusoidal current of a specific frequency is set up through the primary loop, which creates an oscillating magnetic field surrounding the loop. If the loop were located in free space, the geometry of the field could be determined by the Biot-Savart law. However, as shown in FIG. 4, the metal body of the round, and the metal inner surface of the gun tube, act to interfere and reshape the field. This is due to the eddy currents that are set up in the metal, that act to buck out the field from entering. The geometry of the field can be approximated using the method of image currents.

The presence of the inner surface of the gun tube, acts to reduce the magnitude of the magnetic field perpendicular to the surface of the round, to a value $B_1$. The metal body of the round also has the same effect, but since the round and the loop move as one solid piece, this effect is immaterial to the velocity measurement process.

Figure 2:
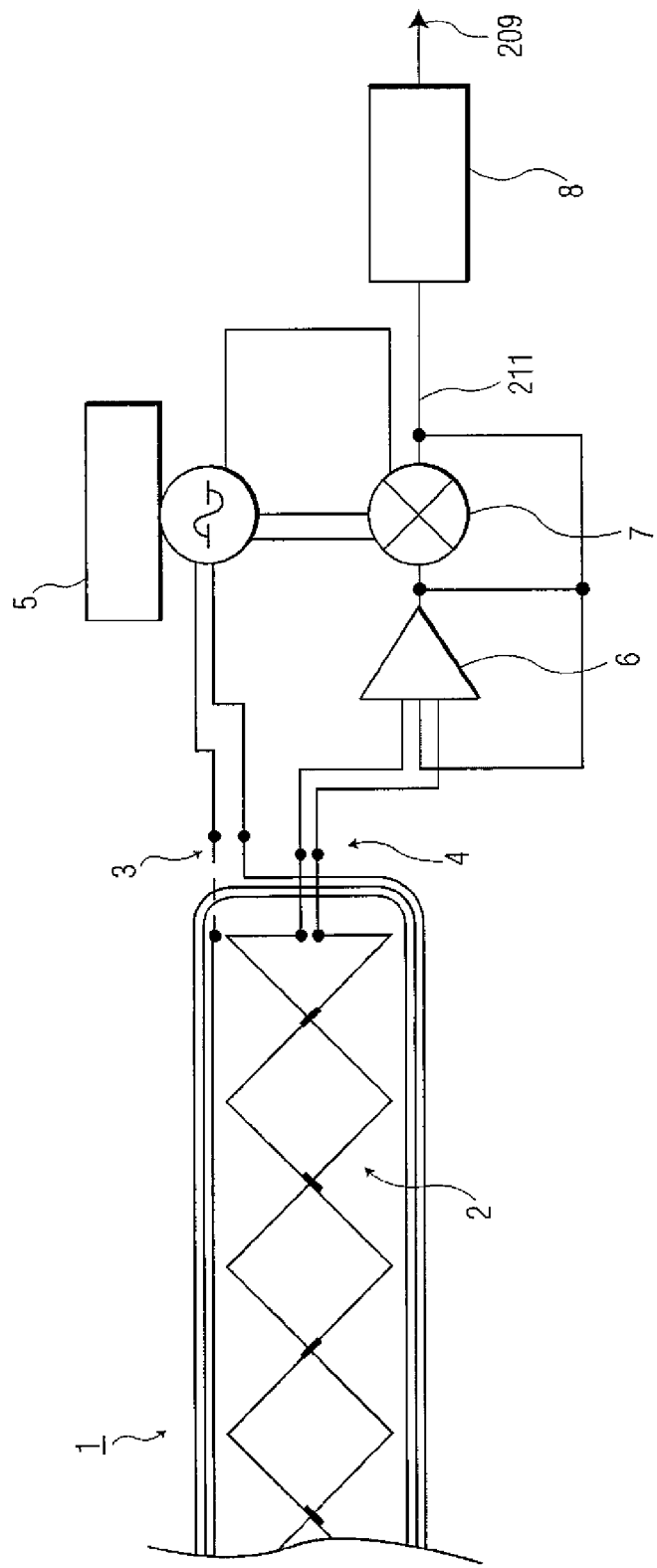
FIG. 2 is a block diagram showing pertinent major sub-systems of a system embodying this invention.

FIG. 2 is a block diagram of the present invention showing pertinent major sub-systems. The invention comprises the planar air-coil transformer as shown previously in FIG. 1, whose primary 1 is driven with an AC current by signal generating circuitry 5. The voltage on the terminals 4 of the secondary of the transformer is fed into an amplifier 6. This new amplified voltage is then synchronously demodulated (also known as lock-in amplified) with a reference signal from the signal generating circuitry. The synchronous demodulation circuitry (mixer 7), is shown as well. Its (new) output 211 is a voltage whose value in time is dependent on the position of the edge of the gun tube relative to the transformer, which shape is better presented at 209 by signal processor 8.

Figure 3:
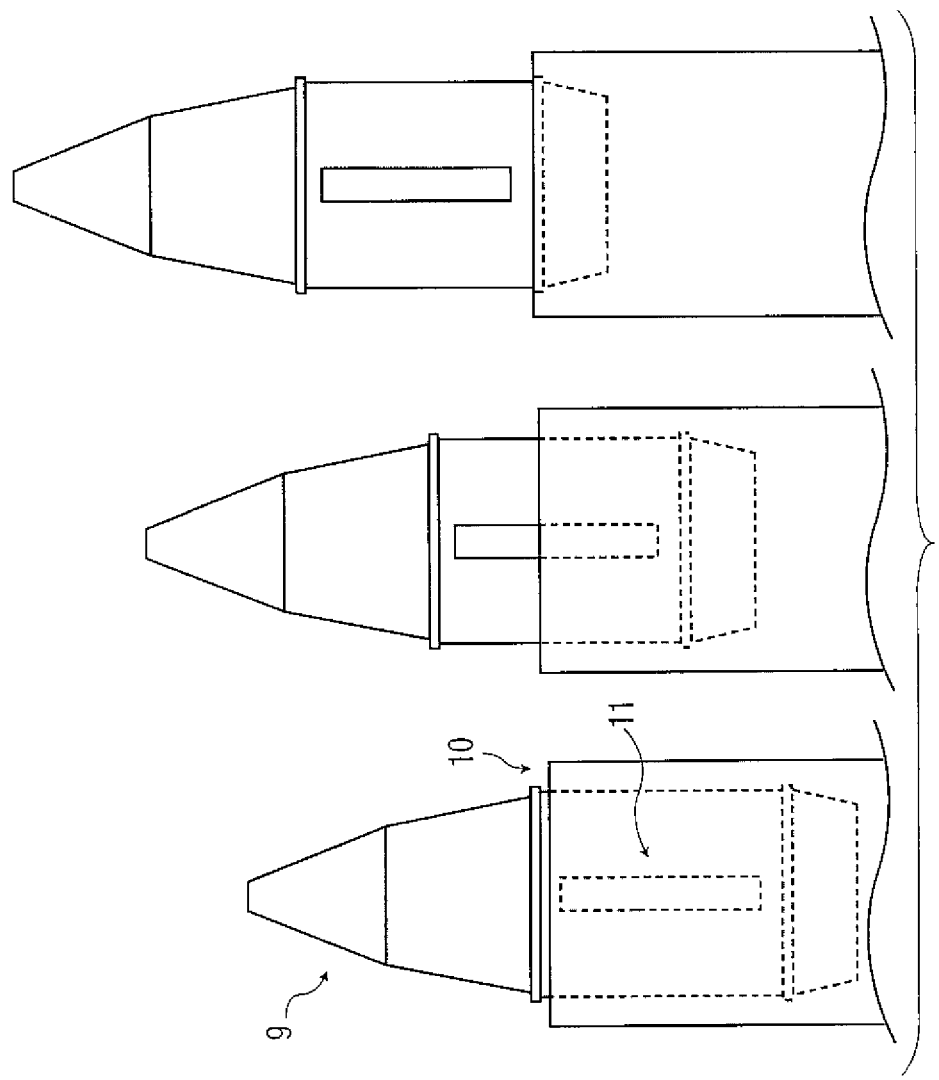
FIG. 3 is an illustration of a smart round 9 exiting through gun tube 10 at three select sequential moments in time.

FIG. 3 is an illustration of smart round 9 exiting gun tube 10 at three sequential moments in time: as the sensing transformer is still inside the tube; as the sensing transformer just exits the tube; and, as the sensing transformer is completely outside the tube. The sensing transformer 11 is located on the side of the round.

FIG. 4 is a cross section of the smart round and the gun tube, at the same moments in time as depicted in FIG. 3. The regions containing AC currents 11, and eddy currents induced on the inner surface of the gun tube 12, are also shown. The strength of the magnetic field 13 generated by the primary, is depicted by arrow lengths between the round and the inner surface of the gun tube. (The longer the lengths of the arrows, the stronger is the field).

Figure 5:
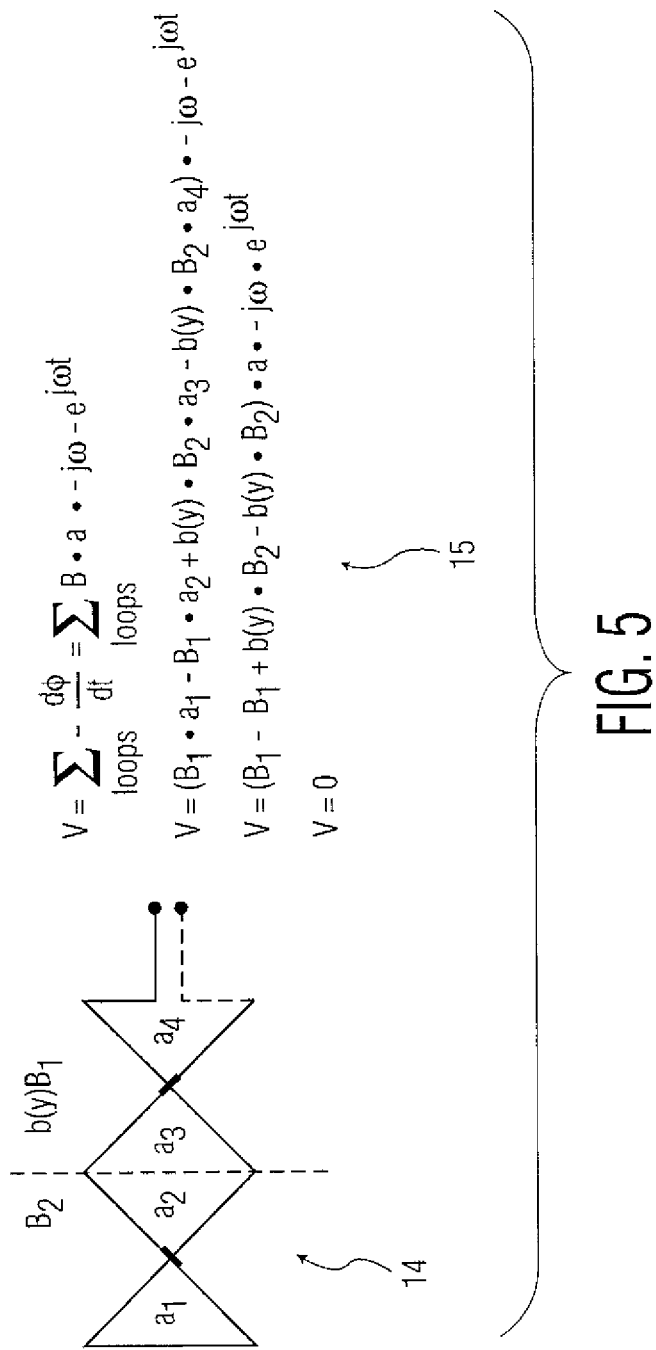
FIG. 5 depicts mathematically the effects of round balloting insensitivity on the sensing transformer.

FIG. 5 illustrates mathematically the effects of round balloting insensitivity on the sensing transformer. A small section of the secondary 14 is shown, comprised of four loop areas $a_1$, $a_2$, $a_3$, and as. While $a_1$ and $a_2$ are subject to oscillating magnetic field strength $B_1$, $a_3$ and $a_4$ are subject to oscillating magnetic field strength $b(y)B_2$, where the magnetic field strength of $B_2$ is modulated by the amount of balloting (balloting here is accounted for by a ratio 'b' which indicates some diminished field strength, in the 'y' direction, where 'y' is perpendicular to the longitudinal axis of the gun tube). Equations 15 show calculations for the Electromotive Forces (EMFs) around each of the areas, and also the voltage at the terminals of the entire section. The magnetic fields are assumed to vary in time as $e^{j\omega t}$. When the transition region between $B_1$ and $b(y)B_2$ is coincident with the boundary between $a_2$ and $a_3$, all of the EMFs around each of the loops cancel, and hence the voltage output of the section is zero. This effect is always the same, regardless of the value of $b(y)$. Therefore it can be seen that the zero crossing of the output voltage will be insensitive to balloting.

Figure 6:
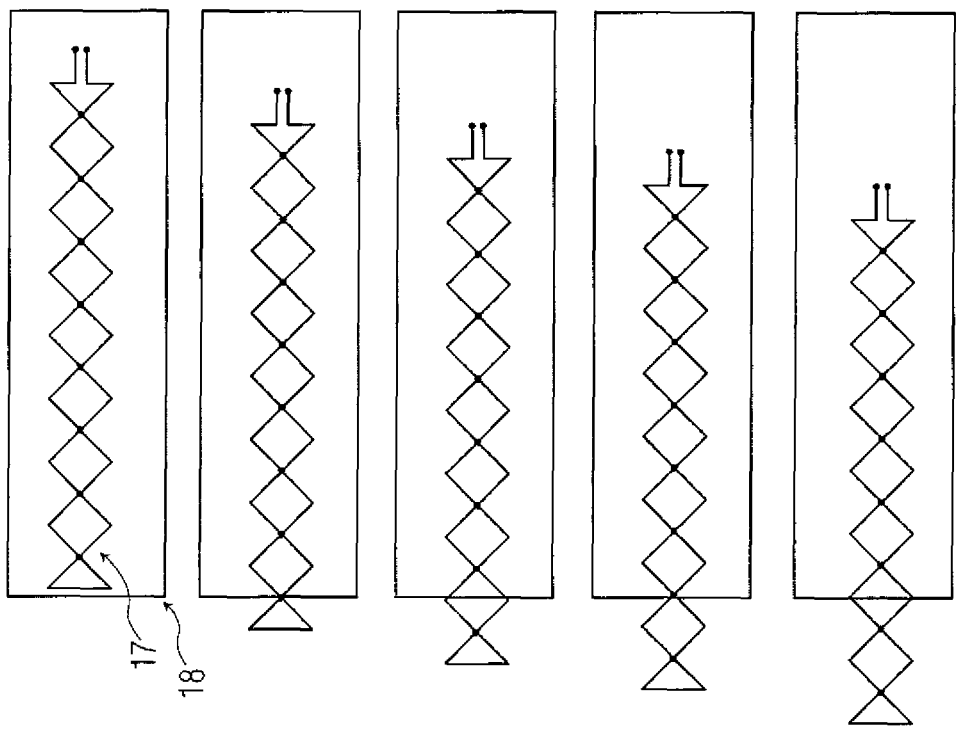
FIG. 6 is a diagram of voltage output of the sensing transformer's secondary, versus round displacement as the round moves past the edge of the gun tube, shown in top-down view.

FIG. 6 is a diagram of voltage output 16 of the sensing transformer's secondary (17) versus its displacement as the round moves past the edge of the gun tube 18, shown in top-down view.

Figure 7:
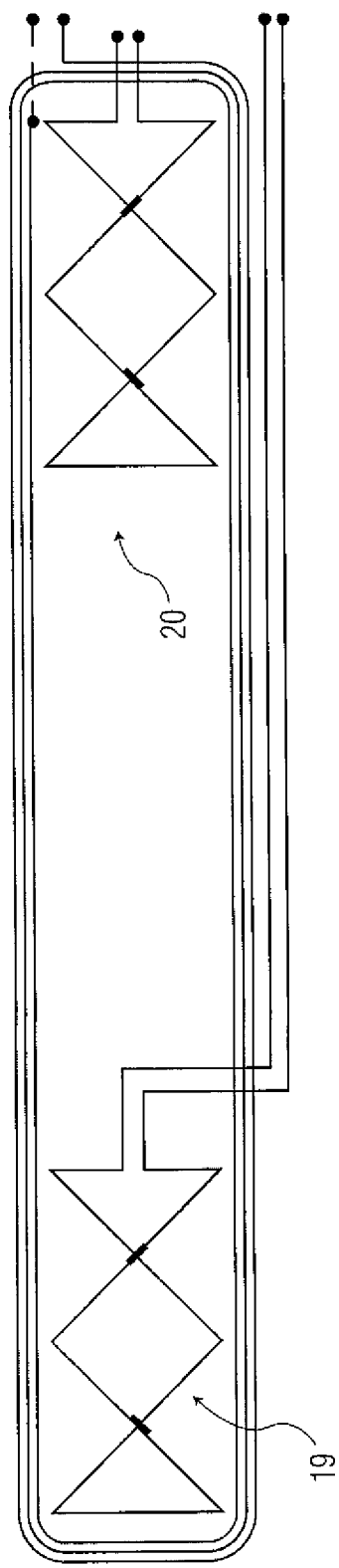
FIG. 7 is a view of another embodiment of the present invention, with the planar air-coil transformer comprising a primary loop but in this case, having two secondary loops.

FIG. 7 is a view of another embodiment of the present invention, with the planar air-coil transformer comprising a primary loop (as in FIG. 1) but in this case, two subsection secondary loops 19 and 20, instead of just the one full secondary loop 2 (as in FIG. 1), are used. It is also possible to have multiple subsectional stages like 19 and 20 (instead of just the two as shown here in FIG. 7), all if within the primary loop.

As the round moves toward the edge of the tube, the edge of the gun tube starts to move past the loop (relatively speaking). As a result, two regions of the magnetic field are created: one of a large perpendicular magnitude $B_2$, and one of the said smaller magnitude $B_1$. Once the round is fully out of the tube, the magnitude is once again entirely $B_2$ over the surface of the sensor.

This entire effect, as mentioned, is diagrammed in FIG. 4, with magnetic field intensities $B_1$ and $B_2$ depicted as arrows in region 13. Rectangle 11 depicts the current carrying region of the primary loop in side view, while rectangle 13 depicts the region of the inner surface of the gun tube that carries image currents.

As mentioned, the secondary sits entirely within the primary, and is exposed to both oscillating field intensities $B_1$ and $B_2$. The turns of the secondary are arranged such that when it is exposed to uniform field intensity throughout its entire length, the sensor is nulled, and ideally no voltage appears at the secondary terminals. This is because all of the EMFs around each of the turns of the secondary cancel. The turns can be viewed as loops of equal area, exposed to equal magnetic field intensities, but wired in criss-cross.

As mentioned, as the sensing transformer is swept past the edge of the gun tube, this null condition is upset. The output voltage of the secondary becomes amplitude modulated, with an amplitude that swings from positive to negative in an oscillating manner. The zero crossings of the amplitude of this AM signal are illustrated in FIG. 5. As the transition region from $B_1$ to $B_2$ passes between areas $a_2$ and $a_3$, the EMFs around the loops cancel. Even with balloting (modeled as modulating $B_1$ to $b(y)$ $B_1$, with y being the amount of balloting off axis), the EMFs around the loops still cancel.

The voltage signal from the secondary is then synchronously demodulated, using the original AC drive signal as a reference. This recovers the amplitude modulation, as shown in FIG. 6. This signal will go through a single temporal period, as the edge of the gun tube passes through a single spatial period over the loops. The times between the zero crossings represent the flight time over fixed distances, from which velocity can be calculated.

Other possible embodiments of the invention include the case where the planar air-coil transformer comprises one primary and two or more secondary coils. As was mentioned with respect to FIG. 7, the geometry of the planar air-coil transformer with two secondary coils 19 and 20 are two subsections of the original secondary coil in the preferred embodiment. Each subsection consists of one zero-crossing zone, creating two displacement references. The electronic measurement circuitry can look for the zero-crossings, and determine the time between when the edge of the gun tube has crossed them (relatively speaking), yielding a velocity measurement.

While the invention may have been described with reference to certain embodiments, numerous changes, alterations and modifications to the described embodiments are possible without departing from the spirit and scope of the invention as defined in the appended claims, and equivalents thereof.

The invention claimed is:

1. In a gun tube having a defined longitude and a defined muzzle edge and a round of ammunition which is fired through said gun tube to exit past said muzzle edge, a round exit velocity measuring sensor to determine muzzle exit velocity of said round, said velocity measuring sensor comprised of:

a planar, air coil transformer attached longitudinally to the side of said round, comprised essentially of a primary coil wire and a secondary coil wire having output terminals thereon, and wherein the primary coil wire comprises several turns in a loop that surrounds the secondary coil wire, so as to create an approximately uniform magnetic field throughout the secondary coil wire, and wherein said secondary coil wire comprises multiple twists, so as to create numerous loops of alternating orientation in said secondary coil wire, wherein the loops proximate the ends of said secondary coil wire are smaller than the other loops, and the sensor further includes:

a current driving electronic circuit to drive a current in the primary coil wire;

a measuring and conditioning electronic circuit to measure and condition the voltage signal at the output terminals of said secondary coil wire, and;

an electronic signal processor that determines the muzzle exit velocity from the measured voltage signal at said secondary coil wire output terminals.

2. The velocity measuring sensor of claim 1, in which:

the current driving electronic circuit is an oscillator, driving said primary coil wire with an AC signal of a specific frequency;

the measuring and conditioning electronic circuit is an amplifier in series with the output terminals of said secondary coil wire to receive a voltage signal therefrom, followed in series by a phase sensitive detector that synchronously demodulates such voltage signal while using said AC signal as a reference, to create a demodulated output signal pattern; and, the electronic signal processor is a circuit that determines time between zero crossings which may occur in the demodulated output signal pattern, and from which the electronic signal processor then determines muzzle exit velocity of the round.

3. In a gun tube having a defined longitude and a defined muzzle edge and a round of ammunition which is fired through said gun tube to exit past said muzzle edge, a round exit velocity measuring sensor to determine muzzle exit velocity of said round, said velocity measuring sensor comprised of:

a planar, air coil transformer attached longitudinally to the side of said round, comprised essentially of a primary coil wire and a plurality of secondary coil wires, each respective secondary coil wire having secondary coil wire output terminals thereon, and wherein the primary coil wire comprises several turns in a loop that completely surrounds all of the secondary coil wires, so as to create an approximately uniform magnetic field throughout the secondary coil wires, and wherein each respective said secondary coil wire comprises multiple twists, so as to create numerous loops of alternating orientation in said respective secondary coil wire, wherein the loops proximate the ends of each respective said secondary coil wire are smaller than the other loops in said respective secondary coil wire, and the remaining secondary coil wires, with the same geometry as the first secondary coil wire, are placed on axis longitudinally with the first secondary coil wire, but with each succeeding respective secondary coil wire positioned on axis longitudinally at a given respective distance after the preceding respective secondary coil wire; and, whereas said velocity measuring sensor further includes:

a current driving electronic circuit to drive a current in the primary coil wire;

a plurality of respective measuring and conditioning electronic circuits to respectively measure and condition the respective voltage signals at the output terminals of each respective said secondary coil wire, and;

an electronic signal processor that determines the muzzle exit velocity from processing the voltage signals measured at all the said secondary coil wire output terminals.

4. The velocity measuring sensor of claim 3, in which:

the current driving electronic circuit is an oscillator, driving said primary coil wire with an AC signal of a specific frequency;

each respective measuring and conditioning electronic circuit an amplifier in series with the output terminals of a respective said secondary coil wire to receive a voltage signal therefrom, followed in series by a phase sensitive detector that synchronously demodulates such voltage signal, while using said AC signal as a reference, to create a respective demodulated output signal pattern; and the electronic signal processor is a circuit that determines time between zero crossings which may occur in the respective demodulated output signal patterns, and from which the electronic signal processor then determines muzzle exit velocity of the round.

\* \* \* \* \*